(12) United States Patent
Kim et al.

(10) Patent No.: US 10,868,634 B2
(45) Date of Patent: Dec. 15, 2020

(54) METHOD FOR TRANSMITTING OR RECEIVING CHANNEL STATE INFORMATION BETWEEN TERMINAL AND BASE STATION IN WIRELESS COMMUNICATION SYSTEM AND DEVICE FOR SUPPORTING SAME

(71) Applicant: LG ELECTRONICS INC., Seoul (KR)

(72) Inventors: Kijun Kim, Seoul (KR); Bonghoe Kim, Seoul (KR); Byounghoon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/331,132

(22) PCT Filed: Sep. 12, 2017

(86) PCT No.: PCT/KR2017/009975
§ 371 (c)(1),
(2) Date: Mar. 6, 2019

(87) PCT Pub. No.: WO2018/048282
PCT Pub. Date: Mar. 15, 2018

(65) Prior Publication Data
US 2019/0260501 A1 Aug. 22, 2019

Related U.S. Application Data

(60) Provisional application No. 62/408,029, filed on Oct. 13, 2016, provisional application No. 62/393,628, filed on Sep. 12, 2016.

(51) Int. Cl.
*H04L 1/00* (2006.01)
*H04W 88/08* (2009.01)
(Continued)

(52) U.S. Cl.
CPC ............. *H04L 1/0005* (2013.01); *H04L 1/00* (2013.01); *H04L 1/0026* (2013.01);
(Continued)

(58) Field of Classification Search
CPC ... H04L 1/0005; H04L 1/0026; H04L 1/0063; H04L 1/00; H04W 488/08; H04W 80/08; H04W 88/023
(Continued)

(56) References Cited

U.S. PATENT DOCUMENTS 8,824,384 B2 * 9/2014 Nam .................. H04L 1/0003 370/329
2011/0206098 A1 * 8/2011 Lindoff ............... H04L 1/0009 375/219
(Continued)

FOREIGN PATENT DOCUMENTS

WO 2016018079 2/2016

OTHER PUBLICATIONS

PCT International Application No. PCT/KR2017/009975, Written Opinion of the International Searching Authority dated Dec. 26, 2017, 24 pages.
(Continued)

*Primary Examiner* — Faisal Choudhury
(74) *Attorney, Agent, or Firm* — Lee, Hong, Degerman, Kang & Waimey PC

(57) ABSTRACT

Disclosed are a method for transmitting or receiving channel state information between a terminal and a base station, and a device for supporting the same. More particularly, disclosed are a method for more elaborately measuring channel state information and a method for transmitting or receiving channel state information based on the same.

7 Claims, 11 Drawing Sheets

(51) Int. Cl.
*H04W 80/08* (2009.01)
*H04W 88/02* (2009.01)

(52) U.S. Cl.
CPC ........... *H04L 1/0063* (2013.01); *H04W 80/08* (2013.01); *H04W 88/023* (2013.01); *H04W 88/08* (2013.01)

(58) Field of Classification Search
USPC ........................................................ 370/329
See application file for complete search history.

(56) References Cited

U.S. PATENT DOCUMENTS

| | | | |
|---|---|---|---|
| 2013/0343290 A1 | 12/2013 | Ren et al. | |
| 2015/0009927 A1 | 1/2015 | Larsson et al. | |
| 2015/0372784 A1* | 12/2015 | Xu | H04L 1/0004 370/329 |
| 2015/0373732 A1* | 12/2015 | Davydov | H04B 7/0628 370/329 |
| 2016/0365944 A1* | 12/2016 | Blankenship | H04W 4/70 |
| 2017/0244434 A1* | 8/2017 | Sesia | H04B 1/1027 |

OTHER PUBLICATIONS

ZTE, "Consideration on channel coding for NR", 3GPP TSGN RAN WG1 Meeting #86, R1-166413, Aug. 2016, 12 pages.

\* cited by examiner

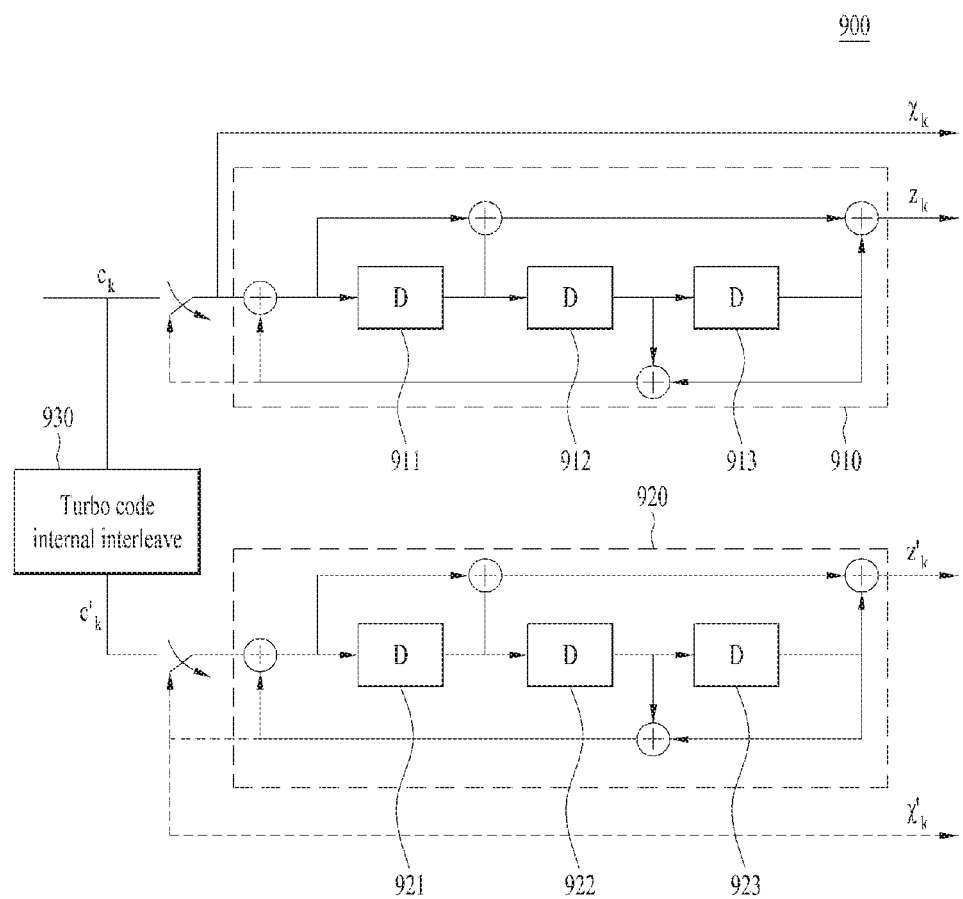

METHOD FOR TRANSMITTING OR RECEIVING CHANNEL STATE INFORMATION BETWEEN TERMINAL AND BASE STATION IN WIRELESS COMMUNICATION SYSTEM AND DEVICE FOR SUPPORTING SAME

CROSS-REFERENCE TO RELATED APPLICATIONS

This application is the National Stage filing under 35 U.S.C. 371 of International Application No. PCT/KR2017/009975, filed on Sep. 12, 2017, which claims the benefit of U.S. Provisional Application No. 62/393,628, filed on Sep. 12, 2016, and 62/408,029, filed on Oct. 13, 2016, the contents of which are all hereby incorporated by reference herein in their entireties.

TECHNICAL FIELD

The following description relates to a wireless communication system, and more particularly to, a method of transmitting and receiving channel state information between a terminal and a base station in a wireless communication system and devices for supporting the same.

More specifically, the following description includes a method of transmitting and receiving channel state information by independently configuring a reference resource for channel state measurement and a reference resource for Modulation and Coding Scheme (MCS) determination and devices for supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

DISCLOSURE OF THE INVENTION

Technical Task

The object of the present disclosure is to provide a method of transmitting and receiving channel state information between a terminal and a base station.

In particular, the object of the present disclosure is to provide a method of determining channel state information, which is different from that defined in the legacy Long-Term Evolution (LTE) system, and a method of transmitting and receiving more accurate channel state information using the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method of transmitting and receiving channel state information between a terminal and a base station in a wireless communication system and devices therefor.

In an aspect of the present disclosure, provided is a method of transmitting channel state information to a base station by a terminal in a wireless communication system. The method may include: receiving, from the base station, information indicating a first reference resource for channel state measurement and a second reference resource for transport block size determination; determining a transport block size based on the second reference resource and determining the channel state information based on the determined transport block size and a channel state measured on the first reference resource; and transmitting the determined channel state information to the base station.

In another aspect of the present disclosure, provided is a terminal for transmitting channel state information to a base station in a wireless communication system. The terminal may include: a transmitter; a receiver; and a processor connected to the transmitter and the receiver. In this case, the processor may be configured to: receive, from the base station, information indicating a first reference resource for channel state measurement and a second reference resource for transport block size determination; determine a transport block size based on the second reference resource and determine the channel state information based on the determined transport block size and a channel state measured on the first reference resource; and transmit the determined channel state information to the base station.

For example, the information indicating the first and second reference resources may be received from the base station through higher-layer signaling.

As another example, information indicating the first reference resource may be received from the base station through Layer 3 signaling, and information indicating the second reference signal may be received from the base station through Layer 1 signaling or Layer 2 signaling.

In the above examples, the first and second reference resources may be independently indicated.

In this case, determining, by the terminal, the channel state information may include: determining the transport block size based on the second reference resource; determining a Modulation and Coding Scheme (MCS) satisfying a condition that a block error probability is equal to or smaller than 10% based on the determined transport block size and channel information measured on the first reference resource; and determining a maximum Channel Quality Indication (CQI) index among CQI indices related to the determined MCS as the channel state information.

In addition, the channel state information may include channel state information for each component carrier, the channel state information for each component carrier may be determined based on a coding scheme used for each component carrier, and either a turbo coding scheme or a Low Density Parity Check (LDPC) coding scheme may be applied as the coding scheme used for each component carrier.

As another example, the determined MCS may be an MCS satisfying the condition that the block error probability is equal to or smaller than 10% based on the determined transport block size and the channel information measured on the first reference resource among a plurality of MCSs. In this case, the plurality of MCSs may include: at least one MCS which corresponds to a CQI index equal to or smaller than a prescribed threshold value and where a first coding scheme is applied; and at least one MCS which corresponds to a CQI index greater than the prescribed threshold value and where a second coding scheme is applied instead of the first coding scheme. Here, each of the first and second coding scheme may be either a turbo coding scheme or a Low Density Parity Check (LDPC) coding scheme.

As a further example, the MCS and the channel state information may be determined by applying a different channel coding scheme depending on the determined transport block size, and the different channel coding scheme may be either the turbo coding scheme or the coding scheme.

In still another aspect of the present disclosure, provided is a method of receiving channel state information from a terminal by a base station in a wireless communication system. The method may include: transmitting, to the terminal, information indicating a first reference resource for channel state measurement and a second reference resource for transport block size determination; and receiving the channel state information from the terminal. In this case, the channel state information may be determined based on a transport block size determined based on the second reference resource and a channel state measured on the first reference resource.

In a further aspect of the present disclosure, provided is a base station for receiving channel state information from a terminal in a wireless communication system. The base station may include: a transmitter; a receiver; and a processor connected to the transmitter and the receiver. In this case, the processor may be configured to: transmit, to the terminal, information indicating a first reference resource for channel state measurement and a second reference resource for transport block size determination; and receive the channel state information from the terminal. The channel state information may be determined based on a transport block size determined based on the second reference resource and a channel state measured on the first reference resource.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present disclosure have the following effects.

According to the present disclosure, compared to the prior art, a terminal can report accurate channel state information to a base station, and the base station can perform reliable downlink data transmission based on the accurate channel state information.

The effects that can be achieved through the embodiments of the present disclosure are not limited to what has been particularly described hereinabove and other effects which are not described herein can be derived by those skilled in the art from the following detailed description. That is, it should be noted that the effects which are not intended by the present disclosure can be derived by those skilled in the art from the embodiments of the present disclosure.

DESCRIPTION OF DRAWINGS

The accompanying drawings, which are included to provide a further understanding of the invention, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 9 is a diagram illustrating a turbo encoder;

FIG. 10 is a diagram illustrating individual elements of a parity check matrix of a Low Density Parity Check (LDPC) code;

MODE FOR CARRYING OUT THE INVENTION

Figure 1:
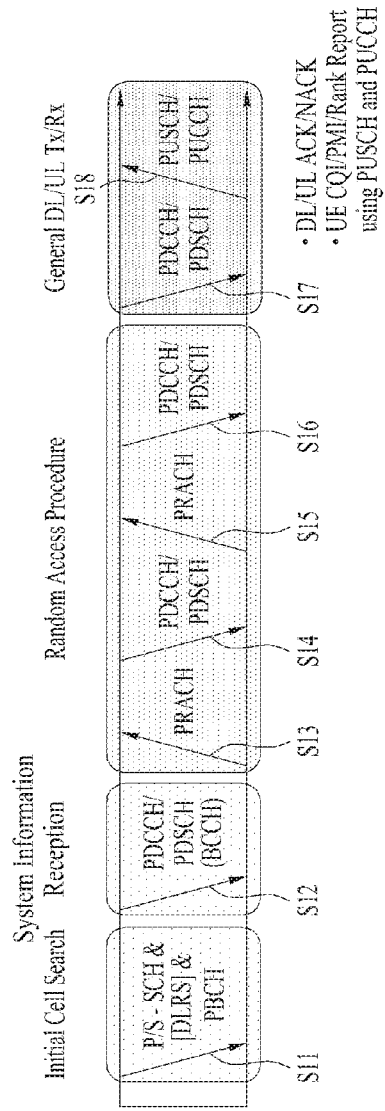
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service, and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1. Overview

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
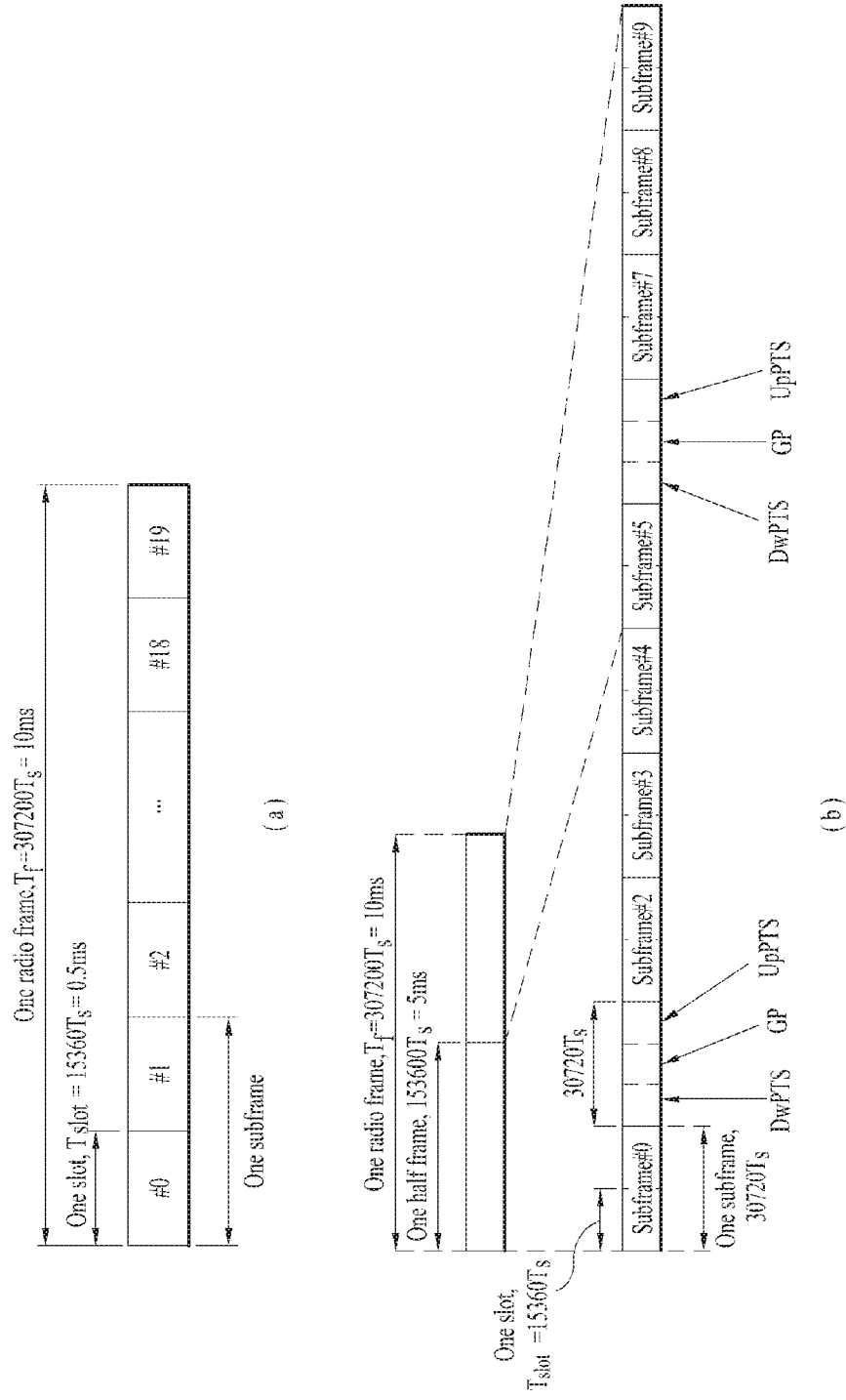
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| | | Normal cyclic prefix in downlink | | | Extended cyclic prefix in downlink | |
| | | | UpPTS | | | UpPTS |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 3:
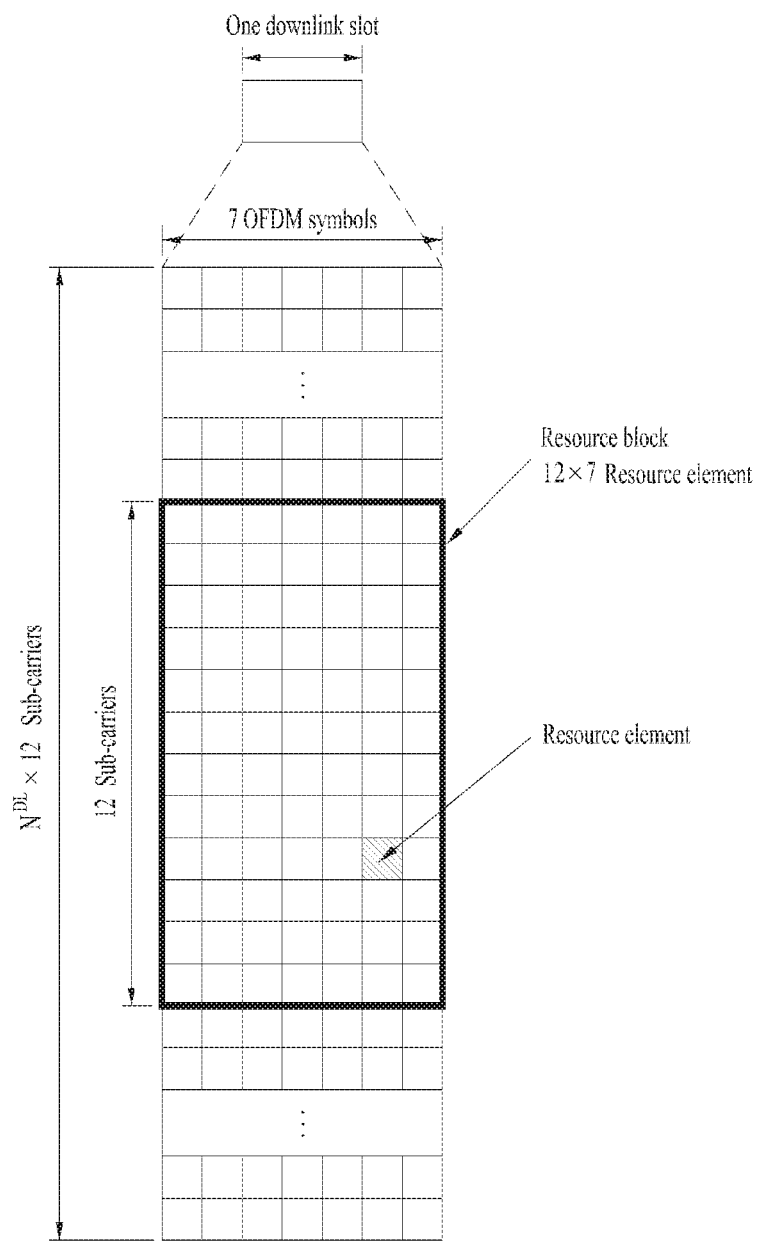
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
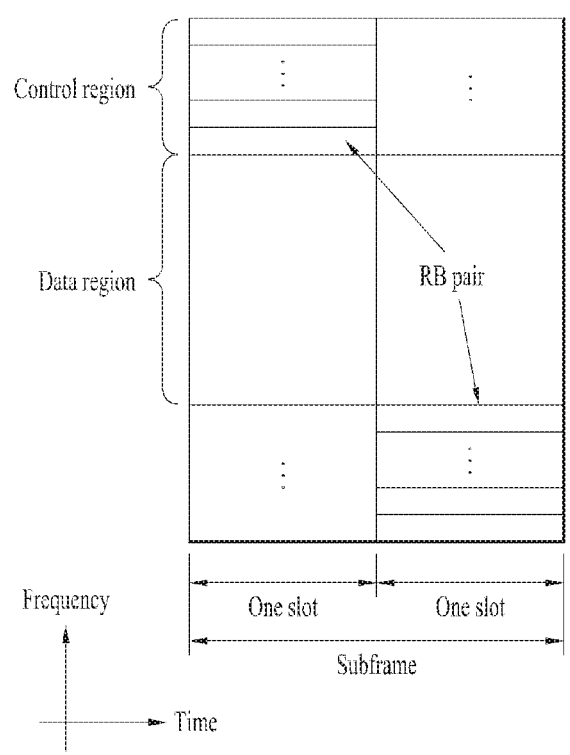
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus, it is said that the RB pair frequency-hops over a slot boundary.

Figure 5:
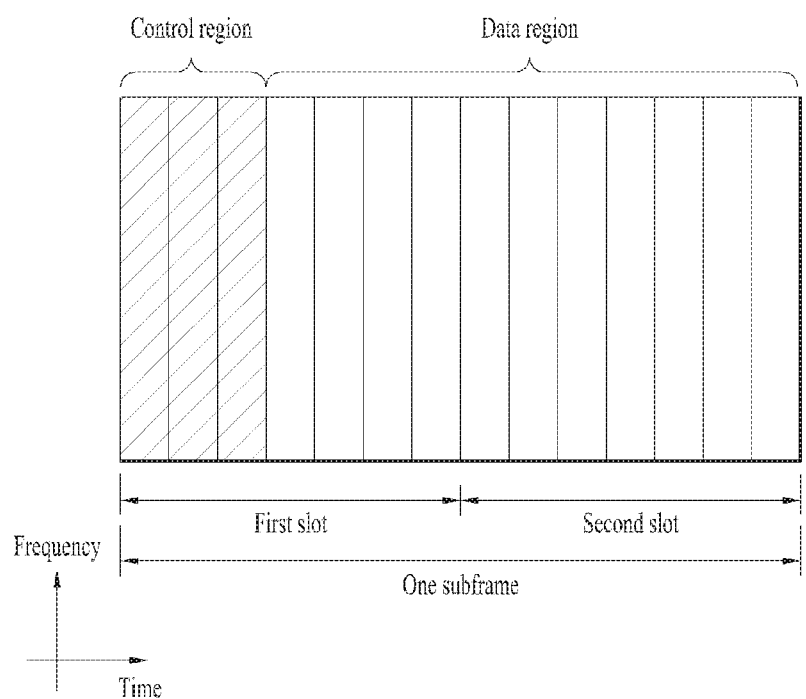
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e., the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

1.2. CSI Reporting

In the 3GPP LTE (-A) system, a UE is defined to report CSI to a BS (eNB). Herein, the CSI means information indicating the quality of a radio channel (also called a link) created between a UE and an antenna port. The CSI includes, for example, a Rank Indicator (RI), a Precoding Matrix Indicator (PMI), and a Channel Quality Indicator (CQI). Herein, the RI, which indicates rank information of a channel, means the number of streams that a UE receives on the same time-frequency resource. The RI value is determined depending on long-term fading of the channel, and thus it is usually fed back to the BS by the UE with a longer periodicity than that of the PMI or CQI. The PMI is a value reflecting the channel space property and indicates a precoding index preferred by the UE based on a metric such as a signal-to-interference-plus-noise ratio (SINR). The CQI is a value indicating the intensity of a channel and typically indicates a received SINR obtained when the BS uses the PMI.

Based on measurement of the radio channel, the UE calculates a preferred PMI and RI, which is capable of deriving the optimal or highest transmission rate when used by the BS, in the current channel state and feeds back the calculated PMI and RI to the BS. Herein, the CQI refers to a modulation and coding scheme of providing an acceptable packet error probability for the fed-back PMI/RI.

The LTE-A system, where accurate MU-MIMO and explicit CoMP operations are expected, may not sufficiently support new operations due to the CSI feedback defined in LTE. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

Table 2 below shows uplink channels used for CSI transmission in the 3GPP LTE (-A) system.

TABLE 2

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 2, CSI may be transmitted using a Physical Uplink Control Channel (PUCCH) with a periodicity defined in higher layers. Depending on whether it is needed by a scheduler, the CSI may be aperiodically transmitted using a Physical Uplink Shared Channel (PUSCH). Transmission of the CSI over the PUSCH is possible only in the case of frequency selective scheduling and aperiodic CSI transmission. Hereinafter, CSI transmission schemes according to scheduling schemes and periodicities will be described.

1) Transmission of CQI/PMI/RI on PUSCH after Reception of a CSI Transmission Request Control Signal (CSI Request)

A PUSCH-scheduling control signal (UL grant) transmitted as a PDCCH signal may include a control signal for requesting CSI transmission. Table 3 below shows UE modes for transmitting the CQI, PMI and RI on the PUSCH.

TABLE 3

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4 bit) 2nd wideband CQI(4 bit) if RI > 1 N*Subband PMI(4 bit) (N is the total # of subbands) (if 8Tx Ant, |

TABLE 3-continued

| | PMI Feedback Type | | |
|---|---|---|---|
| | No PMI | Single PMI | Multiple PMIs |
| UE selected (Subband CQI) | Mode 2-0 RI (only for Open-loop SM) 1st wideband CQI(4 bit) + Best-M CQI(2 bit) (Best-M CQI: Average CQI for M SBs selected from among total N SBs) Best-M index (L bit) | | Mode 2-2 RI 1st wideband CQI(4 bit) + Best-M CQI(2 bit) 2nd wideband CQI(4 bit) + Best-M CQI(2 bit) if RI > 1 * Best-M index (L bit) Wideband PMI(4 bit) + Best-M PMI(4 bit) (if 8Tx Ant, wideband W2 + Best-M W2 + wideband W1) |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes of Table 3 are selected by higher layers, and the CQI/PMI/RI are all transmitted in a PUSCH subframe. Hereinafter, uplink transmission methods performed by a UE in the individual modes will be described.

Mode 1-2 represents a case where precoding matrices are selected on the assumption that data is transmitted only in subbands. A UE generates a CQI on the assumption that a precoding matrix is selected for the system band or the entirety of a band (set S) designated by higher layers. In Mode 1-2, the UE may transmit the CQI and a PMI value for each subband. In this case, the size of each subband may depend on the size of the system band.

In Mode 2-0, a UE may select M preferred subbands for the system band or band (set S) designated by higher layers. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI (WB-CQI) index.

The UE in mode 2-0 may transmit, to a BS, information on the locations of the M selected subbands, one CQI value for the M selected subbands, and a CQI value generated for the entire band or designated band (set S). In this case, the size of each subband and the value of M may depend on the size of the system band.

In Mode 2-2, a UE may simultaneously select locations of M preferred subbands and a single precoding matrix for the M preferred subbands on the assumption that data is transmitted through the M preferred subbands. In this case, a CQI value for the M preferred subbands is defined per codeword. In addition, the UE additionally generates a wideband CQI value for the system band or designated band (set S).

The UE in Mode 2-2 may transmit, to a BS, information on the locations of the M preferred subbands, one CQI value for the M selected subbands, a single PMI for the M preferred subbands, a wideband PMI, and a wideband CQI value. In this case, the size of a subband and the value of M may depend on the size of the system band.

In Mode 3-0, a UE generates a wideband CQI value. The UE generates a CQI value for each subband on the assumption that data is transmitted through each subband. In this case, even if an RI>1, the CQI value represents only the CQI value for the first codeword.

In Mode 3-1, a UE generates a single precoding matrix for the system band or designated band (set S). The UE generates a CQI subband for each codeword by assuming the single precoding matrix generated for each subband. In addition, the UE may generate a wideband CQI by assuming the single precoding matrix. The CQI value for each subband may be expressed in a differential form. The subband CQI value is calculated as a difference between subband CQI and wideband CQI indices. In this case, the size of each subband may depend on the size of the system band.

In Mode 3-2, a UE generates a precoding matrix for each subband instead of a single precoding matrix for the entire band, in contrast with Mode 3-1.

2) Periodic CQI/PMI/RI Transmission Through PUCCH

A UE may periodically transmit CSI (e.g., CQI/PMI/PTI (precoding type indicator) and/or RI information) to a BS on a PUCCH. If the UE receives a control signal instructing transmission of user data, the UE may transmit a CQI on the PUCCH. Even if the control signal is transmitted on a PUSCH, the CQI/PMI/PTI/RI may be transmitted in one of the modes defined in Table 4 below.

TABLE 4

|  |  | PMI Feedback Type | |
|---|---|---|---|
|  |  | No PMI | Single PMI |
| PUCCH CQI feedback type | Wideband (wideband CQI) | Mode 1-0 | Mode 1-1 |
|  | UE selection (subband CQI) | Mode 2-0 | Mode 2-1 |

A UE may operate in transmission modes shown in Table 4. Referring to Table 4, in Mode 2-0 and Mode 2-1, a Bandwidth Part (BP) may mean a set of consecutive subbands in the frequency domain and cover the system band or designated band (set S). In Table 4, the size of each subband, the size of a BP, and the number of BPs may depend on the size of the system band. In addition, the UE transmits CQIs for individual BPs in ascending order in the frequency domain in order to cover the system band or designated band (set S).

The UE may have the following PUCCH transmission types according to transmission combinations of CQI/PMI/PTI/RI.

i) Type 1: a subband CQI (SB-CQI) for Mode 2-0 and Mode 2-1 is transmitted.

ii) Type 1a: an SB CQI and a second PMI are transmitted.

iii) Types 2, 2b and 2c: a WB-CQI and PMI are transmitted.

iv) Type 2a: a WB PMI is transmitted.

v) Type 3: an RI is transmitted.

vi) Type 4: a WB CQI is transmitted.

vii) Type 5: an RI and a WB PMI are transmitted.

viii) Type 6: an RI and a PTI are transmitted.

When the UE transmits an RI and a WB CQI/PMI, the CQI/PMI are transmitted in subframes with different periodicities and offsets. If the RI needs to be transmitted in the same subframe as the WB CQI/PMI, the CQI/PMI are not transmitted.

The current LTE standard uses the 2-bit CSI request field in DCI format 0 or 4 to provide aperiodic CSI feedback, considering a carrier aggregation (CA) environment. In the CA environment, if multiple serving cells are configured for a UE, the UE interprets a CSI request field as two bits. If one of TMs 1 to 9 is set for all Component Carriers (CCs), aperiodic CSI feedback is triggered according to the values in Table 5 below. And, if TM 10 is set for at least one of the CCs, the aperiodic CSI feedback is triggered according to the values in Table 6 below.

TABLE 5

| CSI request field value | Description |
|---|---|
| '00' | No aperiodic CSI reporting is triggered. |
| '01' | Aperiodic CSI reporting is triggered for a serving cell. |
| '10' | Aperiodic CSI reporting is triggered for a first set of serving cells configured by higher layers. |
| '11' | Aperiodic CSI reporting is triggered for a second set of serving cells configured by higher layers. |

TABLE 6

| CSI request field value | Description |
|---|---|
| '00' | No aperiodic CSI reporting is triggered |
| '01' | Aperiodic CSI reporting is triggered for a CSI process set configured by higher layers for a serving cell |
| '10' | Aperiodic CSI reporting is triggered for a first set of CSI processes configured by higher layers |
| '11' | Aperiodic CSI reporting is triggered for a second set of CSI processes configured by higher layers |

Considering the above-described issues, CQI index calculation is generally performed as follows in the LTE-A system.

A UE grasps a channel state using a Reference Signal (RS) transmitted from a BS (eNB) and transmits a CQI index that satisfies a given assumption and has a Block Error Rate (BLER) equal to or less than 10% in order to calculate a CQI in the channel.

Hereinafter, a CQI reporting process will be described in detail. A UE selects an MCS close to a modulation scheme and spectral efficiency of a CQI index among MCSs (i.e., TB sizes and modulation schemes) available on a CSI reference resource based on an RI and a PMI to be reported with a CQI. In addition, the UE determines whether transmission of the corresponding MCS can satisfy a block error probability of 10%. Thereafter, the UE reports to the BS a maximum CQI index among CQI indices where it is expected that final block error probabilities are less than 10%.

Since how many REs are included in the CSI reference resource is an important parameter in calculating the spectrum efficiency, the BS and UE should have the same assumption on the CSI reference resource.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

As such, introduction of new radio access technology considering enhanced mobile broadband communication, massive MTC, and Ultra-Reliable and Low Latency Communication (URLLC) is being discussed. In the present disclosure, for simplicity, this technology will be referred to as New RAT.

2.1. Self-Contained Subframe Structure

Figure 6:
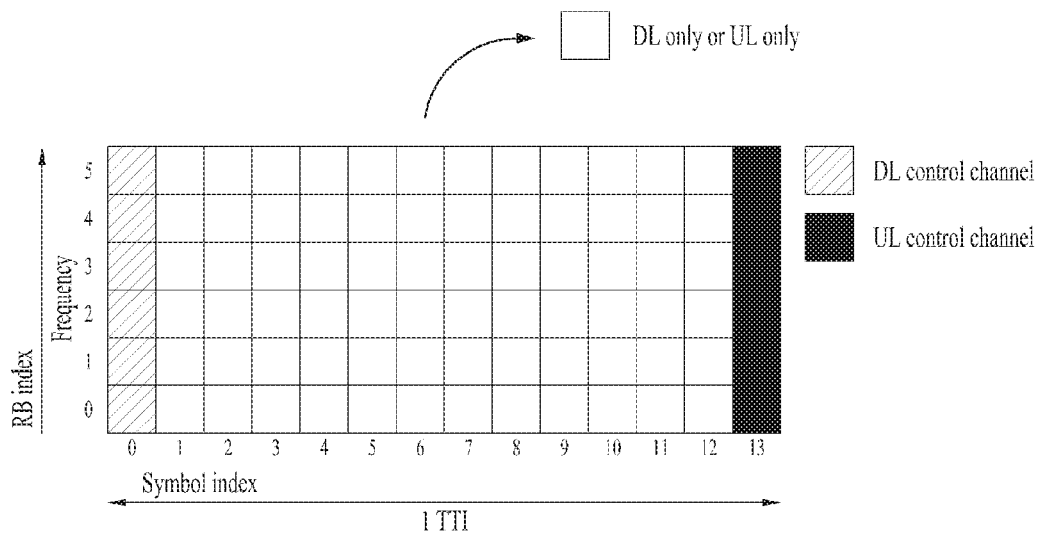
FIG. 6 is a diagram illustrating a self-contained subframe structure applicable to the present disclosure.

FIG. 6 is a diagram illustrating a self-contained subframe structure applicable to the present disclosure.

In the New RAT system to which the present disclosure is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain temporal length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present disclosure may include not only the case of including both the DL control region and the UL control region but also the case of including either the DL control region or the UL control region alone, as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The New RAT system uses the OFDM transmission scheme or a similar transmission scheme. Here, the New RAT system may typically have the OFDM numerology as shown in Table 7.

TABLE 7

| Parameter | Value |
|---|---|
| Subcarrier-spacing (Δf) | 75 kHz |
| OFDM symbol length | 13.33 us |
| Cyclic Prefix(CP) length | 1.04 us/0.94 us |
| System BW | 100 MHz |
| No. of available subcarriers | 1200 |
| Subframe length | 0.2 ms |
| Number of OFDM symbol per Subframe | 14 symbols |

Alternatively, the New RAT system may use the OFDM transmission scheme or a similar transmission scheme and may use an OFDM numerology selected from among multiple OFDM numerologies as shown in Table 8. Specifically, as disclosed in Table 8, the New RAT system may take the 15 kHz subcarrier-spacing used in the LTE system as a base and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 8 are merely an example that is applicable to the New RAT system according to the present disclosure, and the values thereof may depend on the implementation method. Typically, for the 60 kHz subcarrier-spacing, the system bandwidth may be set to 100 MHz. In this case, the number of available subcarriers may be greater than 1500 and less than 1666. Also, the subframe length and the number of OFDM symbols per subframe disclosed in Table 8 are merely an example that is applicable to the New RAT system according to the present disclosure, and the values thereof may depend on the implementation method.

TABLE 8

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 us/4.69 us | 2.60 us/2.34 us | 1.30 us/1.17 us | 0.65 us/0.59 us |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
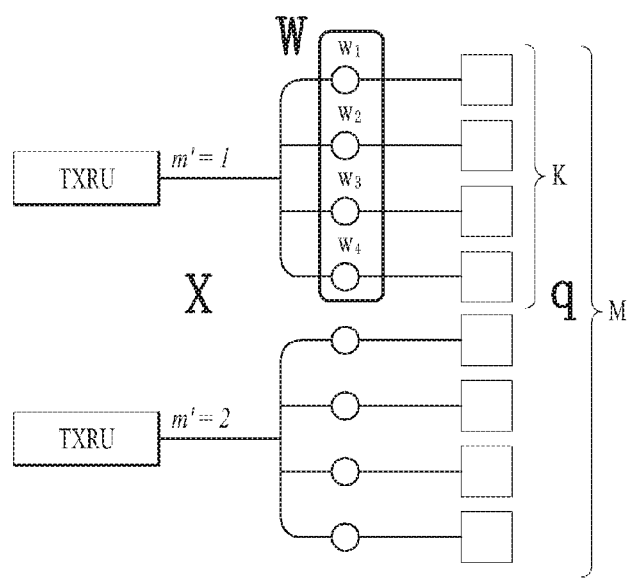
FIGS. 7 and 8 are diagrams illustrating representative methods for connecting TXRUs to antenna elements.
Figure 8:
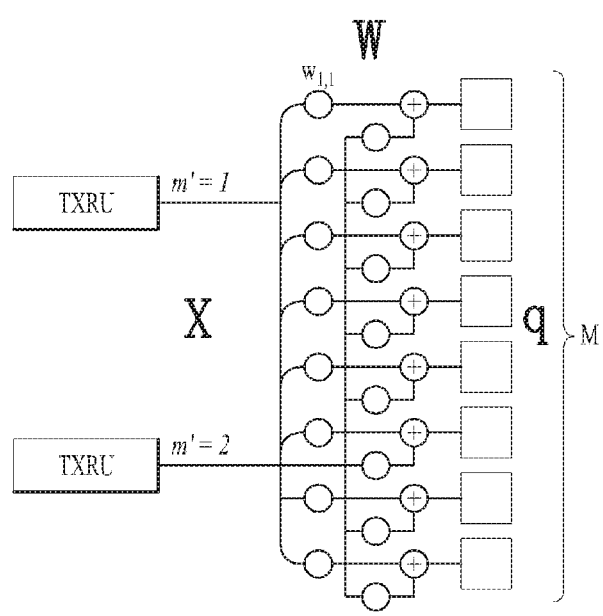

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna elements are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

2.4. CSI Feedback

In the 3GPP LTE or LTE-A system, it is defined that a UE reports Channel State Information (CSI) to a BS (or eNB). Here, the CSI refers to information indicating the quality of a radio channel (or link) formed between the UE and an antenna port.

For example, the CSI may include a Rank Indicator (RI), a Precoding Matrix Indicator (PMI), and a Channel Quality Indicator (CQI).

The RI indicates rank information of a corresponding channel, which means the number of streams that a UE receives on the same time-frequency resource. This value is determined depending on long-term fading of the channel. In addition, the RI may be fed back to the BS by the UE with a period longer than the PMI or CQI.

The PMI is a value reflecting spatial characteristics of a channel and indicates a precoding index preferred by a UE based on a metric such as an SINR.

The CQI is a value indicating the strength of a channel and generally refers to a reception SINR obtained by a BS using the PMI.

In the 3GPP LTE or LTE-A system, a BS may configure a plurality of CSI processes for a UE and receive a CSI report on each process from the UE. Here, a CSI process is configured with a CSI-RS for measuring the quality of a signal from a BS and a CSI-interference measurement (CSI-IM) resource for interference measurement.

2.5. Channel Coding

In general, in a wireless communication system, since signals are transmitted through radio channels, errors may frequently occur. To allow a receiving end to correct an error occurring over a radio channel, a transmitting end transmits information after encoding the information using error correction codes. This process is called channel coding. The receiving end demodulates a received signal, decodes the error correction codes, and then restores the information transmitted by the transmitting end. That is, during the decoding process, the receiving end corrects the error in the received signal occurring over the radio channel. There are various types of error correction codes, for example, a turbo code, a Low Density Parity Check (LDPC) code, etc.

2.5.1. Turbo Code

The turbo code is implemented with a recursive systematic convolution encoder and an interleaver. The turbo code includes an interleaver for facilitating parallel decoding. Interleaving by the interleaver can reduce the impact of a burst error which occurs when a signal is transmitted on a radio channel. As one example of the interleaver, a Quadratic Polynomial Permutation (QPP) interleaver may be used.

Meanwhile, it is known that as the size of a data block increases, the performance of the turbo code also increases. In a real communication system, a data block with a predetermined size or greater is divided into several small data blocks, and each of them is encoded for convenience of implementation.

FIG. 9 illustrates a turbo encoder.

The coding scheme of a turbo encoder 900 corresponds to a Parallel Concatenated Convolutional Code (PCCC) having two eight-state constituent encoders 910 and 920 and one turbo code internal interleaver 930.

Referring to FIG. 9, the turbo encoder 900 includes a first constituent encoder 910, a second constituent encoder 920, and the turbo code internal interleaver 930. Each of the first and second constituent encoders 910 and 920 corresponds to an eight-state constituent encoder. The first constituent encoder 910 includes three delayers 911, 912, and 913, and the second constituent encoder 920 includes three delayers 921, 922, and 923.

In FIG. 9, D is a value determined according to the coding scheme, and $c_k$ is an input to the turbo encoder 900. The outputs from the first and second constituent encoders 910 and 920 are denoted by $z_k$ and $z'_k$, respectively. The value outputted from the turbo code internal interleaver 930 is denoted by $c'_k$. In general, each of the delayers 911, 912, 913, 921, 922, and 923 can delay an input value by one clock. However, each of the delayers 911, 912, 913, 921, 922, and 923 may be configured to delay an input value by one clock or more according to its internal configuration. Each of the delayers 911, 912, 913, 921, 922, and 923 may be implemented using a shift register. In this case, the delayers 911, 912, 913, 921, 922, and 923 may be configured to delay input bits by a predetermined number of clocks and output the delayed input bits to next delayers 911, 912, 913, 921, 922, and 923, respectively.

The turbo code internal interleaver 930 can reduce the impact of a burst error which may occur when a signal is transmitted on a radio channel. For example, the turbo code internal interleaver 930 may be a Quadratic Polynomial Permutation (QPP) interleaver.

As a Forward Error Correction (FEC) code, the turbo code has been used in the LTE system. For example, a data block coded by the turbo code may include three sub-blocks. One sub-block may be equivalent to an m-bit payload, another sub-block may be composed of n/2 parity bits for the payload, which is calculated using an Recursive Systematic Convolution (RSC) code, and the other sub-block may be composed of n/2 parity bits for permutation of the payload data calculated by using the RSC code. For example, the permutation may be performed by an interleaver. Thus, the payload and two different parity-bit sub-blocks may consist of one block. For example, if m is equal to n/2, one block has a code rate of 1/3.

In the first consistent encoder 910, a process for converting input $c_k$ into encoded bits $z_k$ may have two different paths. The first path is configured such that an input end is connected to an output end without output feedback, and the second path is configured such that an input end is fed back to another input end again.

In the first path, input $c_k$, input $c_k$ that passes through the delayer 911, and input $c_k$ that passes through the delayers 911, 912, and 913 enter the output end. The relationship between the input and output ends based on the first path can be expressed as a polynomial. The polynomial for the first path is called a forward generator polynomial and can be expressed as g1 shown in Equation 1 below.

$$g1(D)=1+D+D^3 \quad \text{[Equation 1]}$$

Meanwhile, in the second path, input $c_k$, input $c_k$ that passes through the delayers 911 and 912, and input $c_k$ that passes through the delayers 911, 912, and 913 are fed back to the input end. The polynomial for the second path is called a recursive generator polynomial and can be expressed as g0 in Equation 2 below.

$$g0(D)=1+D^2+D^3 \quad \text{[Equation 2]}$$

In Equations 1 and 2, "+" means Exclusive OR (XOR), and "1" means that an input is delayed zero times. In addition, $D^n$ means that an input is delayed n times.

2.5.2. Low Density Parity Check (LDPC) Code

The LDPC code, which corresponds to a linear block code, has been used in IEEE 802.11n, IEEE 802.11ac, Digital Video Broadcasting (DVB), etc. The LDPC code may be implemented using a generation matrix and a parity check matrix. In the LDPC code, data may be encoded by multiplying message bits with the generation matrix. In general, according to communication standards using the LDPC code, the parity check matrix can be used instead of the generation matrix. For example, data may be encoded using the parity check matrix.

A linear block code may be generated based on a generation matrix G or a parity check matrix H. The linear block code is configured such that the value of $Hc^t$ is zero for every codeword c. As in other linear code blocks, the LDPC code may be decoded by checking whether the product of the parity check matrix H and the codeword c is '0'. For example, the LDPC code may be decoded by checking the product (i.e., $Hc^t$) of the transpose matrix of the codeword c and the parity check matrix is 0.

In the LDPC code, most elements of the parity check matrix are 0, and compared to the code length, the number of non-zero elements is relatively small. Thus, the LDPC code can be repeatedly decoded on the basis of probability. In the initially proposed LDPC code, the parity check matrix is defined to have a non-systematic form and a small weight is equally applied to rows and columns of the parity check matrix. Here, the weight may mean the number of 1s included in a row or a column.

As described above, the number of non-zero elements of the parity check matrix H of the LDPC code is relatively small. Thus, the LDPC code has low decoding complexity and shows performance close to Shannon's theoretical limit. Due to high error correction performance and low decoding complexity, the LDPC code is considered to be suitable for high-speed wireless communication.

Hereinafter, a structured LDPC code will be described.

As described above, the parity check matrix H can be used for generation of the LDPC code. The matrix H is composed of many 0 elements and few 1 elements. The size of the matrix H may be equal to or more than $10^5$ bits and thus, a large memory may be required to represent the matrix H. The elements of the matrix H of the structure LDPC code can be represented as sub-blocks with predetermined sizes as shown in FIG. 10. In FIG. 10, each element of the matrix H corresponds to one sub-block.

Figure 11:
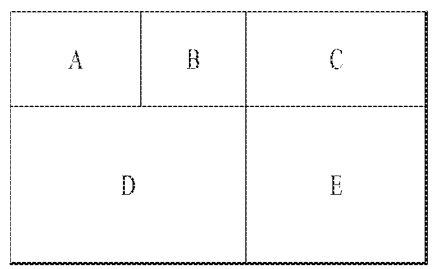
FIG. 11 is a diagram illustrating an example of a parity check matrix applicable to an LDPC code.

FIG. 11 illustrates an example of a parity check matrix applicable to the LDPC code.

As shown in FIG. 11, the parity check matrix may be composed of five sub-matrices: A, B, C, D, and E. Here, A corresponds to systematic bits, and B corresponds to parity bits in the form of a square. The first or last column may have a weight of 1. Non-zero values are located at the last row of B, and the corresponding row may have a weight of 1.

If there is a column with a weight of 1, the remaining columns may include a square matrix of which the first column has a weight of 3. The columns after the 3-weight column may have a dual diagonal structure.

If there is no column with a weight of 1, B may be composed of square matrices, each of which has the first column with a weight of 3. The columns after the 3-weight column may have a dual diagonal structure.

In addition, C is a zero matrix, and E is an identify matrix.

3. Proposed Embodiments

The New RAT (NR) system to which the present disclosure is applicable requires fast HARQ feedback to improve its data transmission latency. In other words, to support the fast HARQ feedback, the NR system requires a fast decoding scheme compared to the prior art. Therefore, in addition to the turbo coding used in the LTE system, other channel coding schemes have been considered. For example, the introduction of a new coding scheme such as LDPC or polar coding with low coding complexity have been discussed.

It is expected that the NR system to which the present disclosure is applicable will coexist with the LTE system for a long period of time due to some reasons such as backward compatibility. Therefore, a UE device according to the present disclosure should be able to support both LTE RAT and New RAT using a dual-mode technique. Alternatively, the UE device should be able to support mode where LTE bands interact with New RAT bands through Carrier Aggregation (CA). Further, to improve data transmission rates, the UE device should be able to support mode where multiple Component Carriers (CCs) in New RAT bands are carrier-aggregated as well as mode where multiple CCs in LTE bands are carrier-aggregated.

In a macro-cell deployment, UE geometry (i.e., the average received SINR of a UE on the assumption that all neighbor BSs perform transmission with maximum power) is distributed in the range of −6 to 20 [dB] due to inter-sector interference caused by side-lobes of beams transmitted from antennas in three sectors. Thus, the received Signal to Interference plus Noise Ratio (SINR) can be improved depending on traffic loads of a neighbor cell, but if resource utilization is high, the improvement degree is not high.

On the contrary, in a small cell, UE geometry is distributed in the range of 0 to 50 [dB] depending on omni-directional antennas and Reference Signal Received Quality (RSRQ) threshold setting for handover. In addition, it is expected that the actual received SINR is much higher because cells do not have high traffic loads. Moreover, when analog beamforming is applied, a neighbor cell may cause interference to only some areas. Thus, the received SINR can be further improved if PDSCH transmission is performed. Specifically, the probability that the received SINR goes below 10 dB is not very high.

For these reasons, different channel coding schemes should be designed for the above two environments. In other words, a channel coding scheme capable of improving performance in a wide Signal to Noise Ratio (SNR) range may be selected for channel coding in a macro cell, whereas a channel coding scheme capable of reducing complexity rather than improving performance may be selected for channel coding in a small cell.

Hence, the present disclosure proposes a method of applying the LTE-turbo code scheme suitable for macro cell deployment and the LDPC scheme suitable for small cells for capacity boosting adaptively depending on situations.

In addition, the present disclosure proposes a method of measuring and reporting Channel State information (CSI) more accurately compared to the legacy LTE system.

3.1. First Method [Configuration of Coding Scheme Per Component Carrier (CC)]

It is assumed that a UE according to the present disclosure can support dual mode for the LTE and NR. The UE may include turbo coding based decoder hardware (HW) for 5 CC LTE (5 CCs for the LTE), which operates in a band of 100 MHz, and new coding based decoder HW for supporting the NR, which operates in another band of 100 MHz. In this specification, a new coding scheme means a coding scheme newly applied to the NR system to which the present disclosure is applicable and may include, for example, coding schemes such as an LDPC code, a polar code, etc. Hereinafter, for convenience of description, a coding scheme different from the turbo code is commonly called the new coding scheme.

The UE can support data transmission over the entire 200 MHz bandwidth using the following CA schemes.

Case 1) 5CC LTE (Turbo)+1CC NR (new coding)
Case 2) 1CC NR (Turbo)+1CC NR (new coding)

According to the present proposed method, in case 2, although the same NR type of CCs are used, a different coding scheme may be configured per CC according to UE capability. This is because otherwise the UE should be equipped with decoder HW for new coding in the 200 MHz bandwidth to support the 2CC NR.

During a UE capability reporting procedure for initial access, the UE according to the present disclosure may report to a BS information on how many CCs the UE can support for the NR, information on how many CCs thereamong the UE can support using the legacy turbo code scheme, and information on how many CCs thereamong the UE can support using the new coding scheme. For example, the UE may report to the BS a combination (CC1, CC2) of the number (CC1) of CCs the UE can support using coding scheme 1 (i.e., legacy turbo coding) and the number (CC2) of CCs the UE can support using coding scheme 2 (i.e., new coding scheme, for example, LDPC coding, etc.).

In this case, the UE may report to the BS all possible combinations that the UE can support. For example, if the UE is designed to share the same HW in performing decoding for the two types of coding schemes, the UE may report the BS that the UE can support the following combinations: (CC1, CC2)=(2, 0), (1, 1), and (0, 2). Alternatively, if the UE is designed to use different HW in performing decoding for the two types of coding schemes, the UE may report the BS that the UE can support only the following combination: (CC1, CC2)=(1, 1) for 2CC.

As a modification example, the UE according to the present disclosure may report to the BS the maximum data rate, R1 that the UE can support using coding scheme 1 and the maximum data rate, R2 that the UE can support using coding scheme 2 during the UE capability reporting procedure for the initial access. In this case, each of the data rates may be represented as the number of Transport Blocks (TBs) transmitted in each Transmission Time Interval (TTI).

The above-described proposed methods can be extensively applied when the NR supports two or more channel coding schemes. For example, when the UE according to the present disclosure uses three channel coding schemes in an interchangeable manner, the UE may report to the BS a combination (CC1, CC2, CC3) of the numbers of CCs that the UE can support using the individual coding schemes. Alternatively, the UE may report to the BS a combination (R1, R2, R3) of the maximum data rates that the UE can support using the individual coding schemes.

In response to the above operations, the BS may configure for the UE individual CCs or PDSCH transmission methods for the individual CCs based on the received UE capability report, designate channel coding schemes to be used for PDSCH transmission, and inform the UE of the designated channel coding schemes. In this case, such information may be transmitted through RRC signaling or DCI. Upon receiving the information, the UE may receive data on a corresponding CC and decode the data using a decoder suitable for one of the designated channel coding schemes.

As another modification example, the UE according to the present disclosure may report to the BS information on a band combination list that the UE can support during the UE capability reporting procedure for the initial access. In addition, the UE may report a channel coding scheme supported in each band in the supportable band combination list. Based on these reports, the BS and UE may determine a channel coding scheme to be used per CC in performing the CA operation on a configured band combination.

The above-described proposed methods can be applied to a PUSCH corresponding to a physical channel for UL data transmission. In this case, the UE according to the present disclosure may separately report to the BS decoding capability (DL data reception capability) and encoding capability (UL data reception capability) of each channel coding scheme during the UE capability reporting procedure for the initial access. Alternatively, when the encoding capability of the UE supports both of the two channel coding schemes, the UE may report only the decoding capability of each channel coding scheme to the BS. When configuring individual CCs or PUSCH transmission methods for the individual CCs for the UE, the BS may designate channel coding schemes to be used for PUSCH transmission and inform the UE of the designated channel coding schemes. In this case, such information may be transmitted via RRC signaling or DCI. Thereafter, the UE may use an encoder suitable for one of the designated channel coding schemes during an encoding procedure for transmitting data on a corresponding CC.

Additionally, the NR system to which the present disclosure is applicable can be designed to operate in all frequency bands from 700 MHz to 100 GHz using various OFDM numerology shown in Table 7 or 8. Considering that as a transmission frequency band increases, subcarrier spacing suitable therefor increases, common OFDM subcarrier spacing may be predesignated for the individual frequency bands. Alternatively, some different OFDM subcarrier spacing may be predesignated for the individual frequency bands.

For example, considering that a frequency band of 6 GHz or lower has good propagation characteristics (which means that a signal can travel over a long distance), the corresponding frequency band is suitable for the macro-cell deployment. And, in this case, subcarrier spacing of 15 or 30 kHz may be suitable. On the contrary, since a frequency band of 6 GHz or higher can support wideband transmission in spite of poor propagation characteristics, subcarrier spacing of 60 kHz or higher may be suitable.

Based on these features, the BS can determine channel coding schemes to be used based on subcarrier spacing for individual CCs. For example, the turbo code scheme may be designated for a CC where the 15 or 30 kHz subcarrier spacing is applied, and the LDPC scheme may be designated for a CC where the 60 kHz subcarrier spacing or higher is applied. Thereafter, the BS and UE may perform DL and UL data transmission according to the designated channel coding schemes.

In this case, the UE can grasp a channel coding scheme of a data channel used for a certain CC based on the magnitudes of main subcarrier spacing used for the individual CCs. In addition, the UE supporting the NR system may report to the BS which subcarrier spacing and how many CCs the UE can support during the UE capability reporting procedure for the initial access. By doing so, the UE supporting the NR system may indirectly inform the BS which channel coding schemes the UE can support.

As another example, the BS according to the present disclosure may determine channel coding schemes to be used based on transmission bandwidths of individual CCs. For example, if a CC has a bandwidth of 20 MHz or lower, the turbo coding scheme may be used. On the other hand, if a CC has a bandwidth of 20 MHz or higher, the LDPC scheme may be used. Thereafter, the BS and UE may perform DL and UL data transmission according to the determined channel coding schemes.

In this case, the UE can grasp a channel coding scheme of a data channel used for a certain CC based on the bandwidths configured for the individual CCs. In addition, the UE supporting the NR system may report to the BS which bandwidths and how many CCs the UE can support during the UE capability reporting procedure for the initial access. By doing so, the UE supporting the NR system may indirectly inform the BS which channel coding schemes the UE can support.

As a further example, the BS according to the present disclosure may determine channel coding schemes to be used based on transmission bands of individual CCs. For example, the turbo coding scheme may be used for a CC in a frequency band of 6 GHz or lower, whereas the LDPC scheme may be used for a CC in a frequency band of 6 GHz or higher. Thereafter, the BS and UE may perform DL and UL data transmission according to the determined channel coding schemes.

In this case, the UE can grasp a channel coding scheme of a data channel used for a certain CC based on the bands configured for the individual CCs. In addition, the UE supporting the NR system may report to the BS which bands and how many CCs the UE can support during the UE capability reporting procedure for the initial access. By doing so, the UE supporting the NR system may indirectly inform the BS which channel coding schemes the UE can support.

The proposed method has an advantage in that if the turbo code scheme is used for a CC where the 15 kHz subcarrier spacing is applied, compatible communication can be achieved between the LTE system and NR system. As a representative important use case, compatible communication between an LTE V2X (Vehicle-to-X (vehicle, nomad, etc.)) device and an NR eV2X (enhanced V2X) device for safety application can be considered.

3.2. Second Method [Configuration of Physical Channel for Data Transmission Per CC]

The second method of the present disclosure proposes to change the names of physical channels for data transmission according to channel coding schemes to be applied. For example, a DL data transmission channel to which coding scheme 1 (e.g., (legacy) turbo code scheme) is applied can be named a Primary PDSCH (PPDSCH), and a DL data transmission channel to which coding scheme 2 (new coding scheme, for example, LDPC coding, polar coding, etc.) is applied can be named as a secondary PDSCH (SPDSCH). In this case, not only may channel coding schemes applied to the PPDSCH and SPDSCH be different from each other, but also peak data rates and rate matching processes that can be supported by the two channels may be different from each other. In addition, payload sizes and Modulation or Coding Schemes (MCSs) applied to the two channels may be different from each other.

During a UE capability reporting procedure for initial access, a UE according to the present disclosure may report to a BS a combination (CC1, CC2) of the number (CC1) of CCs that the UE can support on the PPDSCH and the number (CC2) of CCs that the UE can support on the SPDSCH. The UE may report all combinations that the UE can support to the BS. In response to this, while configuring individual CCs for the UE based on the received UE capability report, the BS may inform the UE which physical channel (i.e., either the PPDSCH or SPDSCH) will be used. Such information may be transmitted via RRC signaling or DCI. Upon receiving the information, the UE may receive/decode a corresponding signal using a decoder suitable for the designated physical channel while receiving data on a corresponding CC.

The above-described proposed method can be applied to a PUSCH corresponding to a physical channel for UL data transmission. In this case, a channel to which coding scheme 1 is applied can be named a Primary PUSCH (PPUSCH), and a UL data transmission channel to which coding scheme 2 is applied can be named as a secondary PUSCH (SPUSCH). The UE according to the present disclosure may report to the BS a combination (CC1, CC2) of the number (CC1) of CCs that the UE can support on the PPUSCH and the number (CC2) of CCs that the UE can support on the SPUSCH during the UE capability reporting procedure for the initial access. At this time, the UE may report all combinations that the UE can support to the BS. Based on the UE capability report, the BS may configure individual CCs for the UE and inform the UE which physical channel (either the PPUSCH or SPUSCH) will be used. Such information may be transmitted via RRC signaling or DCI. Upon receiving the information, the UE may transmit corresponding data on a corresponding CC using an encoder for the designated physical channel during a data transmission procedure.

As a modification example of the method, the UE according to the present disclosure may report to the BS a band combination list that the UE can support during the UE capability reporting procedure for the initial access. In addition, the UE may report to the BS physical channels for DL and UL data transmission supported in each band in the supportable band combination list. Based on these reports, the BS and UE may determine a DL physical channel (PPDSCH or SPDSCH) and a UL physical channel (PPUSCH or SPUSCH) to be used per CC in performing the CA operation on a configured band combination.

3.3. Third Method [Configuration of Coding Scheme According to Data Rate]

The third method of the present disclosure proposes to determine a channel coding scheme to be used based on a transmission data rate (or TB size) of a PDSCH or PUSCH. For example, a BS or UE according to the present disclosure may select one of the following two channel coding schemes with different mother code rates based on data rates and use the selected coding scheme.

Channel coding scheme 1: Turbo code and 1/3 code rate
Channel coding scheme 2: LDPC and 1/2 code rate In other words, in the case of a low data rate (or when a TB with a predetermined size or smaller is transmitted), the BS or UE according to the present disclosure may use channel coding scheme 1 to obtain proper coding gain. In this case, the BS or UE may support a low MCS using channel coding scheme 1.

On the other hand, in the case of a high data rate (or when a TB with a predetermined size or larger is transmitted), the BS or UE according to the present disclosure may use channel coding scheme 2 to appropriately reduce decoding complexity. In this case, the BS or UE may support a high MCS using channel coding scheme 2.

Alternatively, the BS or UE according to the present disclosure may use different methods in segmenting a TB into Code Blocks (CBs), each of which has a predetermined size, and performing encoding per CB according to the number of CBs. For example, when the number of CBs is equal to or less than a predetermined value, the BS or UE according to the present disclosure may use channel coding scheme 1. On the contrary, when this condition is not satisfied, the BS and UE may use channel coding scheme 2.

Alternatively, when a TB has a predetermined size or larger, the BS or UE according to the present disclosure may segment the TB to generate CBs. If each CB has a predetermined size or smaller, the BS or UE may use channel coding scheme 1. On the contrary, when this condition is not satisfied, the BS or UE may use channel coding scheme 2.

More specifically, a method of segmenting a TB into CBs with different sizes instead of segmenting the TB into CBs with the same size can be applied. For example, when the maximum size of a CB is 5000 bits, the BS or UE according to the present disclosure may segment a TB with a size of 23000 bits into four CBs each having a size of 5000 bits and a CB with a size of 3000 bits. Then, the BS or UE may apply channel coding scheme 2 to the 5000-bit CBs and apply channel coding scheme 1 to the 3000-bit CB. In this case, the CB to which channel coding scheme 1 is applied can be referred to as a primary CB, and the CB to which channel coding scheme 2 is applied can be referred to as a secondary CB. Thus, according to this proposed method, the secondary CB may be configured to support only a fixed size (N bits), and the primary CB may be configured to support various sizes from 1 to N bits. In other words, when a CB has the maximum size, the BS or UE according to the present disclosure may use channel coding scheme 2. On the other hand, when the size of a CB is smaller than the maximum size, the BS or UE may use channel coding scheme 1.

As a modification example of the proposed method, the BS or UE according to the present disclosure may determine a channel coding scheme to be used based on a coding rate of a transmitted PDSCH or PUSCH (or a ratio between the number of transmission information bits and the number of coded bits). Here, the coding rate may be determined by the number of coded bits transmitted on the final physical channel after a rate matching process is performed by a circular buffer, etc. In contrast to the coding rate, a mother code rate may be determined by the number of coded bits generated by an encoder, that is, the number of coded bits input into a circular buffer. Therefore, when the coding rate is low, the BS or UE according to the present disclosure may use channel coding scheme 1 in order to obtain coding gain. On the other hand, when the coding rate is high, the BS or UE according to the present disclosure may use channel coding scheme 2 in order to reduce decoding complexity. Here, the coding rate may mean a coding rate determined when an initial PDSCH or PUSCH is transmitted according to HARQ.

As another modification example of the proposed method, the BS or UE according to the present disclosure may determine a channel coding scheme to be used based on a bandwidth or PRB size allocated for PDSCH or PUSCH transmission. For example, when the allocated bandwidth is equal to or higher than a predetermined value, the BS or UE according to the present disclosure may use channel coding scheme 2 to reduce decoding complexity. In Multi Input Multi Output (MIMO) transmission, if a TB is transmitted via multiple layers, the BS or UE according to the present disclosure may determine a channel coding scheme to be used based on the size of an effective PRB allocated for a PDSCH or PUSCH. Here, the effective PRB size may be defined based on a product of a transmission layers and a PRB.

In addition, which size of a TB (coding rate or bandwidth) is used for determining or changing a channel coding scheme to be used can be promised between the BS and UE in advance. Alternatively, the UE may report a value that the UE can support during the UE capability reporting procedure for the initial access. While configuring a PDSCH or PUSCH, the BS may inform the UE of a reference value (e.g., TB size, coding rate value, bandwidth size, etc.) for changing or determining the channel coding scheme by indicating the corresponding value. In this case, this information may be transmitted to the UE through RRC signaling, DCI, or the like.

As a further modification example, the size of a TB (coding rate or bandwidth) corresponding to a reference value for changing a channel coding scheme to be applied may be determined differently depending on the number of CCs configured by the BS for the UE. For example, it is assumed that a UE reports to a BS that the UE can decode up to X bits per unit time using channel coding scheme 1 as its UE capability and the BS configures Y CCs for the UE. In this case, if the size of a TB is less than X/Y, the UE may be configured to use channel coding scheme 1 for each CC. On the contrary, if the size of a TB is more than X/Y for each CC, the UE may be configured to use channel coding scheme 2 for each CC.

3.4. Fourth Method [Indication of Coding Scheme Via DCI]

A BS can receive data from a plurality of UEs through a plurality of CCs. Thus, from the perspective of the BS, it can be more efficient to dynamically determine a channel coding scheme based on relative data rates of PUSCHs received through all CCs in the same subframe than to determine the channel coding scheme with reference to a specific threshold for data rates as described in the third method. Therefore, the fourth method according to the present disclosure proposes that a BS determines a channel coding scheme to be used for PUSCH transmission and then informs a UE of the channel coding scheme through grant DCI for allowing the PUSCH transmission.

Alternatively, the fourth method according to the present disclosure proposes that a BS determines a channel coding scheme to be used for PDSCH transmission and informs a UE of the channel coding scheme through scheduling DCI for informing the PDSCH transmission. In this case, the BS may dynamically determine a channel coding scheme to be applied to (or used for) each PDSCH based on data rates of PDSCHs scheduled on a plurality of CCs configured for a specific UE. By doing so, the BS can increase transmission efficiency at the UE.

Additionally, if a specific UE reports as its UE capability that the specific UE can decode up to X bits (or support up to Z bps (bit per second)) per unit time using channel coding scheme 1, the BS may determine a channel coding scheme of a PDSCH transmitted in each CC such that the sum of data rates of PDSCHs transmitted using channel coding scheme 1 does not exceed Z. In this case, if scheduling is performed such that the sum of the data rates of the PDSCHs which are transmitted over all CCs in a specific transmission interval using channel coding scheme 1 exceeds Z, the UE may decode some of the PDSCHs.

When a PDSCH or PUSCH is retransmitted by HARQ, a channel coding scheme used for initial transmission may be applied to the retransmitted PDSCH or PUSCH. Thus, an indicator indicating a channel coding scheme may be included in DCI related to initial transmission, but the corresponding indicator may not be included in DCI for requesting retransmission.

For example, in HARQ transmission based on Incremental Redundancy (IR), a channel coding indicator for indicating a channel coding scheme may be transmitted together with a Redundancy Version (RV) number. In other words, if an RV number of transmitted coded bits used for HARQ initial transmission is 0, the channel coding indicator is included. On the contrary, if the RV number has other values except 0, which is mainly used for retransmission, the channel coding indicator may not be included in corresponding DCI. For example, the BS according to the present disclosure may indicate RVs and channel coding schemes using some fields of DCI as shown in Table 9.

TABLE 9

| Indicator | RV number | Channel coding scheme |
|---|---|---|
| 0 | RV 0 | Coding scheme 1 |
| 1 | RV 0 | Coding scheme 2 |
| 2 | RV 1 | The same coding scheme as initial transmission |
| 3 | RV 2 | The same coding scheme as initial transmission |

Meanwhile, when channel coding scheme 1 is applied to HARQ transmission based on Chase Combining (CC) and channel coding scheme 2 is applied to IR-based HARQ transmission, the BS according to the present disclosure may indicate RVs and channel coding schemes using some fields of DCI as shown in Table 10.

TABLE 10

| Indicator | RV number | Channel coding scheme |
|---|---|---|
| 0 | RV 0 | Coding scheme 1 |
| 1 | RV 0 | Coding scheme 2 |
| 2 | RV 1 | Coding scheme 2 |
| 3 | RV 2 | Coding scheme 2 |

Referring to Table 10, when the UE or BS retransmits data, the UE or BS may use a channel coding scheme different from that used for the initial transmission.

3.5. Fifth Method [Indication of Physical Transmission Channel Via DCI]

The fifth method of the present disclosure proposes that when the name of a physical channel for data transmission is changed according to an applied channel coding scheme as described in the second method, a BS dynamically informs a UE whether either a PPDSCH to which coding scheme 1 is applied or an SPDSCH to which coding scheme 2 is applied will be transmitted through DL-related DCI. Alternatively, the fifth method of the present disclosure proposes that a BS dynamically informs a UE whether either a PPUSCH to which coding scheme 1 is applied or an SPUSCH to which coding scheme 2 is applied will be transmitted for UL data transmission through UL-related DCI.

In this case, if DCI indicating PPDSCH transmission has the same size as DCI indicating SPDSCH transmission, the BS according to the present disclosure may inform the type of a physical transmission channel carrying DL data through a specific field included in the DL-related DCI. On the contrary, if the DCI indicating the PPDSCH transmission and the DCI indicating the SPDSCH transmission have different sizes, the UE according to the present disclosure may perform blind decoding of DCI associated with each type of physical DL data transmission channel in a PDCCH transmission region while performing blind searches for DCI transmitted to the UE. In this case, the UE may be separately allocated a region in which PPDSCH-related DCI can be transmitted (i.e., a search space for the PPDSCH-related DCI) and a region in which SPDSCH-related DCI can be transmitted (i.e., a search space for the SPDSCH-related DCI) within a transmission region of a control channel or a Control Channel Element (CCE) transmission region. At this time, the following restriction may be imposed: either a PPDSCH or SPDSCH shall be transmitted to one UE in one subframe.

If DCI indicating PPUSCH transmission has the same size as DCI indicating SPUSCH transmission, the BS according to the present disclosure may inform a UE of the type of a physical transmission channel carrying UL data through a specific field included in the UL-related DCI. On the contrary, if the DCI indicating the PPUSCH transmission and the DCI indicating the SPUSCH transmission have different sizes, the UE according to the present disclosure may perform blind decoding of DCI associated with each type of physical UL data transmission channel in a PDCCH transmission region while performing blind searches for DCI transmitted to the UE.

In addition, not only channel coding schemes applied to a PPDSCH and an SPDSCH but also MCS sets and/or resource allocation granularity applied to the two channels may be different from each other. For example, the PPDSCH may be configured such that it supports 25 MCSs and PDSCH transmission resources are allocated on one PRB basis. In addition, the PPDSCH may be configured such that a predetermined number of RBs or less should be allocated as transmission resources. In other words, the PPDSCH may be restricted such that 100 RBs or more cannot be allocated as transmission resources. In contrast to the PPDSCH, the SPDSCH may be configured such that it supports 8 MCSs and PDSCH transmission resources are allocated on 4-PRB basis. In addition, the SPDSCH may be configured such that a predetermined number of RBs or more should be allocated as transmission resources. That is, the SPDSCH may be restricted such that 50 RBs or less cannot be allocated as transmission resources.

Additionally, when physical channels for data transmission are categorized as a PPDSCH and an SPDSCH based on applied channel coding methods as described in the above examples, a BS can simultaneously transmit the two channels as follows. In addition, in response to the above operation, a UE can receive the two channels as follows.

In this case, it is assumed that by differently configuring granularity of a TB transmitted in each channel, the sum of TB sizes transmitted in the two channels can support a TB size with fine granularity. For example, the SPDSCH may support only a TB size corresponding to an integer multiple of N bits, and the PPDSCH may support a TB size from 1 to N bits. Specifically, in the case of N=5000, 23000 transmission bits may be divided into TB with a size of 4*N=20000 bits and a TB with a size of 3000 bits. Thereafter, the TBs may be transmitted through the SPDSCH and PPDSCH, respectively. In other words, transmitted information may be divided into a portion corresponding to an integer multiple of N and a portion smaller than N and then transmitted through the SPDSCH and PPDSCH, respectively.

In particular, according to the present disclosure, the SPDSCH and PPDSCH, which are simultaneously transmitted in one subframe or Transmission Time Interval (TTI), may be scheduled by independent DCI or a single piece of DCI.

First, regarding a method of scheduling an SPDSCH and a PPDSCH through independent DCI, the following two operations can be considered: the two channels are simultaneously transmitted in one subframe; and one of the two channels is transmitted. The distinguishment between the two operations may be determined according to whether DCI therefor is detected. For example, since SPDSCH scheduling DCI schedules a TB size corresponding to an integer multiple of N bits, resource allocation for the DCI may be composed of resources equal to or more than a specific RB. Meanwhile, since PPDSCH scheduling DCI schedules a TB size from 1 to N bits, resource allocation for the DCI may be composed of resources equal to or less than the specific RB.

In addition, regarding a method of scheduling an SPDSCH and a PPDSCH through a single piece of DCI, the total TB size may be indicated through separate signaling, and sizes of TBs transmitted on the SPDSCH and PPDSCH may be determined according to above-described rule. In addition, for resource allocation for the two channels, the amount of resources allocated for the two channels may be indicated through separate signaling, and then the allocated resources may be divided between the two channels based on the ratio between the sizes of the transmitted TBs according to a predetermined rule.

Moreover, according to the above method, when the SPDSCH and PPDSCH are simultaneously transmitted, HARQ feedback therefor (i.e., ACK/NACK bit information) may be separately transmitted for the individual channels. Alternatively, ACK/NACK bits for the two channels may be combined and then transmitted (for example, a scheme of transmitting ACK feedback only when both of the two channels are ACK).

Although the above configuration is described based on the PPDSCH and SPDSCH, which are DL data channels, the corresponding configuration can be extensively applied to a PPUSCH and an SPUSCH corresponding to UL data channels. In other words, a UE may transmit data in the same manner as described above.

3.6. Sixth Method [CSI Reporting Method]

Hereinafter, a method of reporting CSI including a CQI, PMI, and RI in a system using multiple channel coding schemes according to above-described various methods will be explained in detail.

When a channel coding scheme to be used for a DL data channel is configured per CC as described in the first and second methods, a CQI for each CC can be calculated by applying a channel coding scheme used for a corresponding CC (or based on the channel coding scheme). That is, a UE may assume that a PDSCH using an indicated channel coding scheme is transmitted on a CSI reference resource, determine whether a PDSCH transmitted with an MCS corresponding to a CQI index can satisfy a block error probability of 10%, and then report the maximum index among CQI indices of which block error probabilities are less than 10%.

TABLE 11

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 11 shows CQIs based on the turbo code of the legacy LTE system. Specifically, Table 11 shows Spectral Efficiency (SE) per CQI index obtainable at each of Signal to Noise Ratio (SNR) points spaced by an interval of 1.7 dB with reference to a SNR versus SE curve based on the turbo code.

However, when different channel coding schemes are used as described in the present disclosure, an SNR versus SE curve may vary according to each channel coding scheme, and thus SE obtainable at the same SNR point may also vary. Therefore, the present disclosure defines independent CQI tables for individual channel coding schemes and proposes a method by which a BS and a UE use the CQI tables. That is, a different CQI table may be used depending on a channel coding scheme used for DL data transmission.

When a channel coding scheme applied to a DL data channel transmitted on a single CC varies as described in the third to fourth methods, a UE can report CSI using the following CSI reporting methods.

3.6.1. First CSI Reporting Method

According to the present disclosure, a different channel coding scheme can be applied depending on a CQI index reported by a UE.

As a representative example, if the CQI index is smaller than a predetermined threshold value, a UE may assume that channel coding scheme 1 is applied and then determine whether a PDSCH transmitted with an MCS corresponding to the CQI index can satisfy a block error probability of 10%. Alternatively, if the CQI index is greater than the predetermined threshold value in contrast to the above example, the UE may assume that channel coding scheme 2 is applied and then determine whether the PDSCH transmitted with the MCS corresponding to the CQI index can satisfy the block error probability of 10%. Here, a BS may inform the UE of the threshold through RRC signaling.

3.6.2. Second CSI Reporting Method

According to the present disclosure, a different channel coding scheme can be applied depending on a TB size of an MCS to be applied to a CSI reference resource. Here, the TB size may be predetermined based on an MCS level and a bandwidth size of the CSI reference resource.

As a representative example, if the TB size is smaller than a predetermined threshold value, a UE may assume that channel coding scheme 1 is applied to a corresponding TB. Here, the threshold value may be predetermined or configured by a BS through RRC signaling.

In the above proposed method, an MCS index corresponding to (or associated with) a specific TB size varies depending on a size of a CSI reference resource (e.g., bandwidth).

3.6.3. Third CSI Reporting Method

The above-described CSI reference resource determines a bandwidth for measuring CSI of a channel. Accordingly, a UE calculates the CSI on the assumption that a PDSCH is transmitted on resources occupied by the CSI reference resource. For example, in case the CSI reference resource is defined as a narrow band, the UE may calculate and report CSI in each subband.

Such a subband CSI reporting method is efficient in that on a frequency-selective fading channel, a BS selects scheduled UEs per subband and determines a transmission PMI per subband. In this case, all UEs are scheduled with multiple subbands depending on the total number of active UEs rather than with a single subband. Thus, a TB size used for actual PDSCH transmission is greater than that assumed by a UE for CSI calculation.

To overcome the above problem, the present disclosure proposes a method of independently configuring sizes of a reference resource for CSI measurement (hereinafter referred to as a measurement reference resource) and a reference resource for MCS determination (hereinafter referred to as a transmission reference resource). In this proposed method, it is assumed that a channel environment measured using the measurement reference resource can be equally applied to the transmission reference resource.

In this case, a different channel coding scheme may be applied depending on a TB size of an MCS to be applied to the transmission reference resource.

As a representative example, if the TB size is smaller than a predetermined threshold value, channel coding scheme 1 may be applied. Here, the threshold value may be predetermined or signaled by the BS through RRC signaling.

In addition, the measurement reference resource and transmission reference resource may be configured by the BS through RRC signaling. In this case, the BS may configure the measurement reference resource and transmission reference resource, respectively (or independently). Alternatively, the BS may indicate a ratio between the sizes of the transmission reference resource and the measurement reference resource.

As a modification example of the proposed method, the BS may configure for the UE the measurement reference resource through RRC signaling corresponding to L3 signaling and the transmission reference resource through L1 or L2 signaling. According to this method, it is possible to handle a case where a size of a subband averagely allocated to one UE varies depending on a change in the number of active UEs.

In the above configuration, a signal indicating the size of the transmission reference resource may be included in DCI triggering aperiodic CSI reporting so that it may be transmitted whenever the DCI is transmitted. Alternatively, the signal may be transmitted to a UE through independent DCI, which is separated from the CSI-triggering DCI.

3.6.4. Fourth CSI Reporting Method

The present disclosure proposed that a BS semi-statically configures a channel coding scheme that a UE needs to assume when reporting CSI or dynamically indicate the channel coding scheme.

In this case, while semi-statically configuring a CSI reporting method for a UE through RRC signaling, the BS may indicate which channel coding scheme will be applied for CSI reporting.

In particular, if the BS allocates a plurality of CSI processes to the UE, the BS may inform the UE of a channel coding scheme to be applied to PDSCH transmission per CSI process. In this case, a channel coding scheme to be considered for CSI calculation may be determined depending on a CSI process related to CSI reporting.

3.6.5. Fifth CSI Reporting Method

ABS can inform a UE which channel coding scheme the UE needs to apply to report CSI through DCI triggering aperiodic CSI reporting. In particular, when the BS allocates a plurality of CSI processes to the UE, the BS may indicate a channel coding scheme to be applied to PDSCH transmission per CSI process first and then inform which CSI process is related to the triggered CSI reporting through the DCI triggering the aperiodic CSI reporting.

3.6.6. Sixth CSI Reporting Method

According to the present disclosure, when reporting CSI, a UE can report its preferred channel coding scheme together.

Specifically, when a PDSCH is transmitted on a measurement reference resource or a transmission reference resource, the UE may compare a maximum MCS obtainable by applying channel coding scheme 1 and a maximum MCS obtainable by applying channel coding scheme 2 and then report a channel coding scheme with a higher MCS as its preferred channel coding scheme. In addition, the UE may also report a CQI corresponding to a maximum MCS obtained by applying the preferred channel coding scheme.

As a modification example, the UE may determine the size of the transmission reference resource and report information on the size of the transmission reference resource together with the preferred channel coding scheme.

3.6.7. Seventh CSI Reporting Method

According to the present disclosure, a UE can report multiple pieces of CSI by considering channel coding schemes determined for CSI reporting individually.

Specifically, the UE may create CQIs by considering a predetermined number of channel coding schemes and report the CQIs. In this case, the UE may determine and report an RI and a PMI, which are included in CSI, regardless of the channels coding schemes.

In this case, to reduce signaling overhead, the UE may operate as follows. First, the UE may determine a default channel coding scheme among the multiple channel coding schemes. For the default channel coding scheme, the UE may report a normal CQI, but for other channel coding schemes, the UE may report differences with respect to the CQI of the default channel coding scheme.

3.7. Summary

Figure 12:
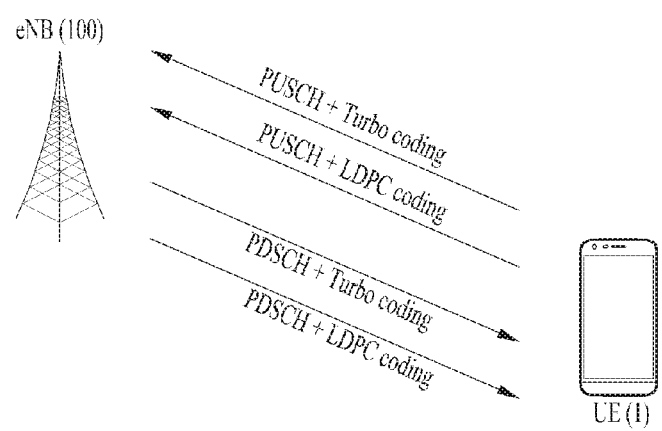
FIG. 12 is a diagram schematically illustrating data signal transmission and reception operations between a BS and a UE according to the present disclosure.

FIG. 12 schematically illustrates data signal transmission and reception operations between a BS and a UE according to the present disclosure.

As shown in FIG. 12, the BS and UE can use the turbo coding scheme or LDPC coding scheme for PDSCH or PUSCH transmission and reception. In this case, the individual signal transmission configurations shown in FIG. 12 may be independent from each other. For example, among the four signal transmission configurations of FIG. 12, only one signal transmission configuration may exist, or all of the four signal transmission configurations may exist. Moreover, considering a Carrier Aggregation (CA) environment, each of the signal transmission configurations shown in FIG. 12 may be extended to a plurality of signal transmission configurations. Thus, it could be interpreted to mean that the following description includes all the above-described features.

First, the BS according to the present disclosure operates as follows.

The BS determines a first coding scheme to be applied to a downlink data signal to be transmitted to the UE. In this case, either a turbo coding scheme or a Low Density Parity Check (LDPC) coding scheme may be used as the first coding scheme.

In this case, the BS may consider, as reference conditions for determining the first coding scheme, at least one of: (1) a Component Carrier (CC) on which the downlink data signal is transmitted; (2) subcarrier spacing applied to the CC on which the downlink data signal is transmitted; (3) a transmission bandwidth applied to the CC on which the downlink data signal is transmitted; and (4) a transmission band of the CC on which the downlink data signal is transmitted.

For example, if the subcarrier spacing applied to the CC on which the downlink data signal is transmitted is greater than a first reference value, the BS may apply the LDPC coding scheme to the corresponding downlink data signal. On the contrary, if the above condition is not satisfied, the BS may apply the turbo coding scheme to the corresponding downlink data signal. In this case, 30 kHz subcarrier spacing or 60 kHz subcarrier spacing may be used as the first reference value.

As another example, if the transmission bandwidth applied to the CC on which the downlink data signal is transmitted is greater than a second reference value, the BS may apply the LDPC coding scheme to the corresponding downlink data signal. On the contrary, if the above condition is not satisfied, the BS may apply the turbo coding scheme to the corresponding downlink data signal. In this case, a bandwidth of 20 MHz may be used as the second reference value.

As still another example, if the transmission band of the CC on which the downlink data signal is transmitted is greater than a third reference value, the BS may apply the LDPC coding scheme to the corresponding downlink data signal. On the contrary, if the above condition is not satisfied, the BS may apply the turbo coding scheme to the corresponding downlink data signal. In this case, 6 GHz may be used as the third reference value.

As a further example, if the downlink data signal has a relatively high data rate, the BS may apply the LDPC coding scheme to the corresponding downlink data signal. On the contrary, if the above condition is not satisfied, the BS may apply the turbo coding scheme to the corresponding downlink data signal.

As still a further example, if the downlink data signal has a relatively high coding rate (e.g., 1/2), the BS may apply the LDPC coding scheme to the corresponding downlink data signal. On the contrary, if the above condition is not satisfied (for example, coding rate=1/3), the BS may apply the turbo coding scheme to the corresponding downlink data signal.

The BS may transmit information on the first coding scheme applied to the downlink data signal to the UE. In this case, the information on the first coding scheme may be transmitted via RRC signaling or DCI.

The BS may encode the downlink data signal using the first coding scheme and then transmit the encoded downlink data signal to the UE.

In response to the above-described BS operation, the UE according to the present disclosure can operate as follows.

The UE according to the present disclosure may receive the information on the first coding scheme applied to the downlink data signal from the BS.

Next, the UE may receive, from the BS, the downlink data signal encoded using the first coding scheme.

In addition, the UE may decode the downlink data signal using the first coding scheme. By doing so, the UE can correctly obtain the downlink data signal.

Moreover, the BS according to the present disclosure can operate as follows. Specifically, the BS may perform the following operation and the above-described downlink data transmission operation at the same time or perform only the following operation without performing the downlink data transmission operation.

The BS may determine a second coding scheme to be applied to an uplink data signal to be received from the UE. In this case, either the turbo coding scheme or LDPC coding scheme may be used as the second coding scheme.

In this case, to determine the second coding scheme, the BS may consider the aforementioned conditions which the BS considers in determining the first coding scheme.

The BS may transmit, to the UE, information on the second coding scheme to be applied to the uplink data signal. Next, the BS may receive, from the UE, the uplink data signal encoded using the second coding scheme and then decode the uplink data signal using the second coding scheme. By doing so, the BS can obtain the uplink data signal correctly.

In corresponding to the above-described BS operation, the UE according to the present disclosure can operate as follows.

The UE according to the present disclosure may receive the information on the second coding scheme to be applied to the uplink data signal from the BS. Next, the UE may encode the uplink data signal using the second coding scheme and then transmit the encoded uplink data signal to the BS.

Figure 13:
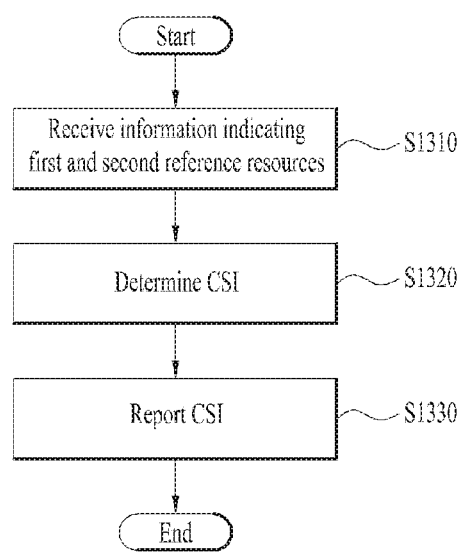
FIG. 13 is a flowchart illustrating a method in which a UE reports channel state information according to the present disclosure.

FIG. 13 is a flowchart illustrating a method in which a UE reports CSI according to the present disclosure.

The UE receives information indicating a first reference resource for channel state measurement and a second reference resource for transport block size determination [S1310]. Here, the first reference resource may correspond to the above-described CSI reference resource or measurement reference resource, and the second reference resource may correspond to the above-described MCS reference resource or transmission reference resource.

The information indicating the first and second reference resources may be received in various ways.

For example, the information indicating the first and second reference resources may be received from the BS through higher-layer signaling. In addition, the information indicating the first and second reference resources may be transmitted as a single piece of information or different pieces of information.

As another example, information indicating the first reference resource may be received from the BS through Layer 3 signaling, and information indicating the second reference resource may be received from the BS through Layer 1 signaling or Layer 2 signaling. Specifically, the information indicating the first reference resource may be transmitted through RRC signaling, and the information indicating the second reference resource may be transmitted through DCI, a PDCCH, etc.

In the above examples, the first and second reference resources may be independently indicated.

Next, the UE determines a transport block size based on the second reference resource and determines the CSI based on the determined transport block size and a channel state measured using the first reference resource [S1320].

More specifically, the UE may determine the transport block size based on the second reference resource, determine a Modulation and Coding Scheme (MCS) satisfying a condition that a block error probability is equal to or smaller than 10% based on the determined transport block size and channel information measured using the first reference resource, and determine a maximum Channel Quality Indication (CQI) index among CQI indices related to the determined MCS as the CSI.

In this case, a different coding scheme may be applied to each CC. For example, a turbo coding scheme may be applied to one CC, and an LDPC coding scheme may be applied to another CC. In this case, the UE may determine CSI per CC based on a coding scheme used for each CC.

Alternatively, a different coding scheme may be applied depending on a CQI index determined by the UE as the CSI. For example, a first coding scheme may be applied to a CQI index equal to or smaller than a prescribed threshold value, and a second coding scheme may be applied to a CQI index equal to or greater than the prescribed threshold value. In addition, the first coding scheme may be applied to an MCS corresponding to the CQI index where the first coding scheme is applied, and the second coding scheme may be applied to an MCS corresponding to the CQI index where the second coding scheme is applied. By considering the above issues, the UE may determine an MCS satisfying a predetermined condition and a maximum CQI index related to the MCS.

Alternatively, the UE may determine the CSI on the assumption that different channel coding is applied depending on the transport block size determined based on the second reference resource. In other words, the UE may apply a different channel coding scheme depending on the determined transport block size when determining the MCS and the CSI.

Thereafter, the UE transmits the determined CSI to the BS [S1330].

4. Device Configuration

Figure 14:
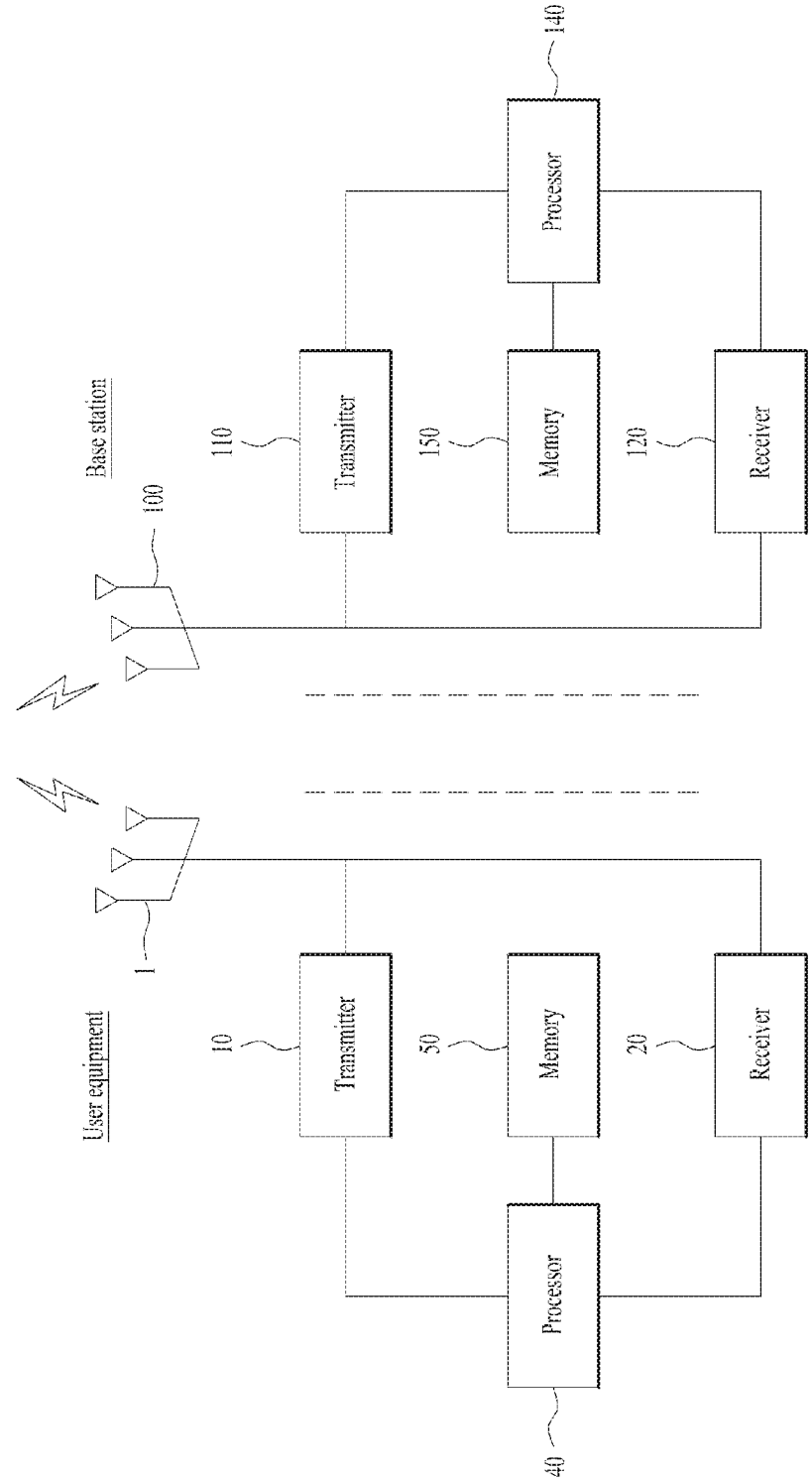
FIG. 14 is a diagram illustrating configurations of a UE and a BS for implementing the proposed embodiments.

FIG. 14 illustrates configurations of a UE and a BS for implementing the proposed embodiments. The UE and BS illustrated in FIG. 14 operate to implement the embodiments of the CSI transmission and reception method between a UE and a BS.

The UE 1 may act as a transmission end in uplink and a reception end in downlink. The BS (e-Node B (eNB) or new generation Node B (gNB)) 100 act as a reception end in uplink and a transmission end in downlink.

Each of the UE and BS may include a transmitter 10/110 and a receiver 20/120 for controlling transmission and reception of information, data, and/or messages and an antenna 30/130 for transmitting and receiving information, data, and/or messages.

In addition, each of the UE and BS may include a processor 40/140 for implementing the above-described embodiments of the present disclosure and a memory 50/150 for temporarily or permanently storing operations of the processor 40/140.

With the above-described configuration, the UE 1 receives, from the BS 100 through the receiver 20, information indicating a first reference resource for channel state measurement and a second reference resource for TB size determination. Next, the UE 1 determines a TB size based on the second reference resource through the processor 40. And, the UE 1 determines the CSI based on the determined TB size and a channel state measured using the first reference resource. Thereafter, the UE 1 may transmit the determined CSI to the BS through the transmitter 10.

The BS 100 transmits, to the UE 1 through the transmitter 110, the information indicating the first reference resource for the channel state measurement and the second reference resource for the TB size determination. Thereafter, the BS 100 receives the CSI from the UE 1 through the receiver 120.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

What is claimed is:

1. A method of transmitting channel state information to a base station (BS) by a user equipment (UE) in a wireless communication system, the method comprising:
   receiving, from the BS, information indicating a first reference resource for measuring a channel state and a second reference resource for determining a transport block size;
   determining the transport block size based on the second reference resource;
   determining a modulation and coding scheme (MCS) satisfying a condition that a block error probability is equal to or smaller than 10% based on the transport block size and the channel state measured on the first reference resource; and
   determining a maximum channel quality indication (CQI) index among CQI indices related with the MCS as the channel state information; and
   transmitting, to the BS, the channel state information,
   wherein the channel state information comprises channel state information for each component carrier,
   wherein the channel state information for the each component carrier is determined based on a coding scheme used for the each component carrier, and
   wherein the coding scheme used for the each component carrier is either a turbo coding scheme or a low density parity check (LDPC) coding scheme.

2. The method of claim 1, wherein the information on the first and second reference resources is received from the BS through higher-layer signaling.

3. The method of claim 1, wherein information on the first reference resource is received from the BS through Layer 3 signaling, and
   wherein information on the second reference resource is received from the BS through Layer 1 signaling or Layer 2 signaling.

4. The method of claim 1, wherein the first and second reference resources are independently indicated.

5. The method of claim 1, wherein the MCS is an MCS satisfying the condition that the block error probability is equal to or smaller than 10% based on the transport block size and the channel state measured on the first reference resource among a plurality of MCSs,
   wherein the plurality of MCSs comprise:
   at least one MCS related with a CQI index equal to or smaller than a predetermined threshold value and to which a first coding scheme is applied; and
   at least one MCS related with a CQI index greater than the predetermined threshold value and to which a second coding scheme is applied instead of the first coding scheme, and
   wherein each of the first and second coding scheme is either a turbo coding scheme or a low density parity check (LDPC) coding scheme.

6. The method of claim 1, wherein the MCS and the channel state information is determined respectively based on applying a different channel coding scheme depending on the transport block size,
   wherein the different channel coding scheme is either a turbo coding scheme or a low density parity check (LDPC) coding scheme.

7. A user equipment (UE) for transmitting channel state information to a base station (BS) in a wireless communication system, the UE comprising:
   a transmitter;
   a receiver; and
   at least one processor coupled with the transmitter and the receiver,
   wherein the at least one processor is configured to:
   receive, from the BS, information on a first reference resource for measuring a channel state and a second reference resource for determining a transport block size;
   determine the transport block size based on the second reference resource;
   determine a modulation and coding scheme (MCS) satisfying a condition that a block error probability is equal to or smaller than 10% based on the transport block size and the channel state measured on the first reference resource; and
   determine a maximum channel quality indication (CQI) index among CQI indices related with the MCS as the channel state information; and
   transmit, to the BS, the channel state information,
   wherein the channel state information comprises channel state information for each component carrier,
   wherein the channel state information for the each component carrier is determined based on a coding scheme used for the each component carrier, and
   wherein the coding scheme used for the each component carrier is either a turbo coding scheme or a low density parity check (LDPC) coding scheme.

* * * * *